April 21, 1936.  E. S. COOK ET AL  2,038,147
WHEEL SLIDING PROTECTOR DEVICE
Filed July 31, 1934
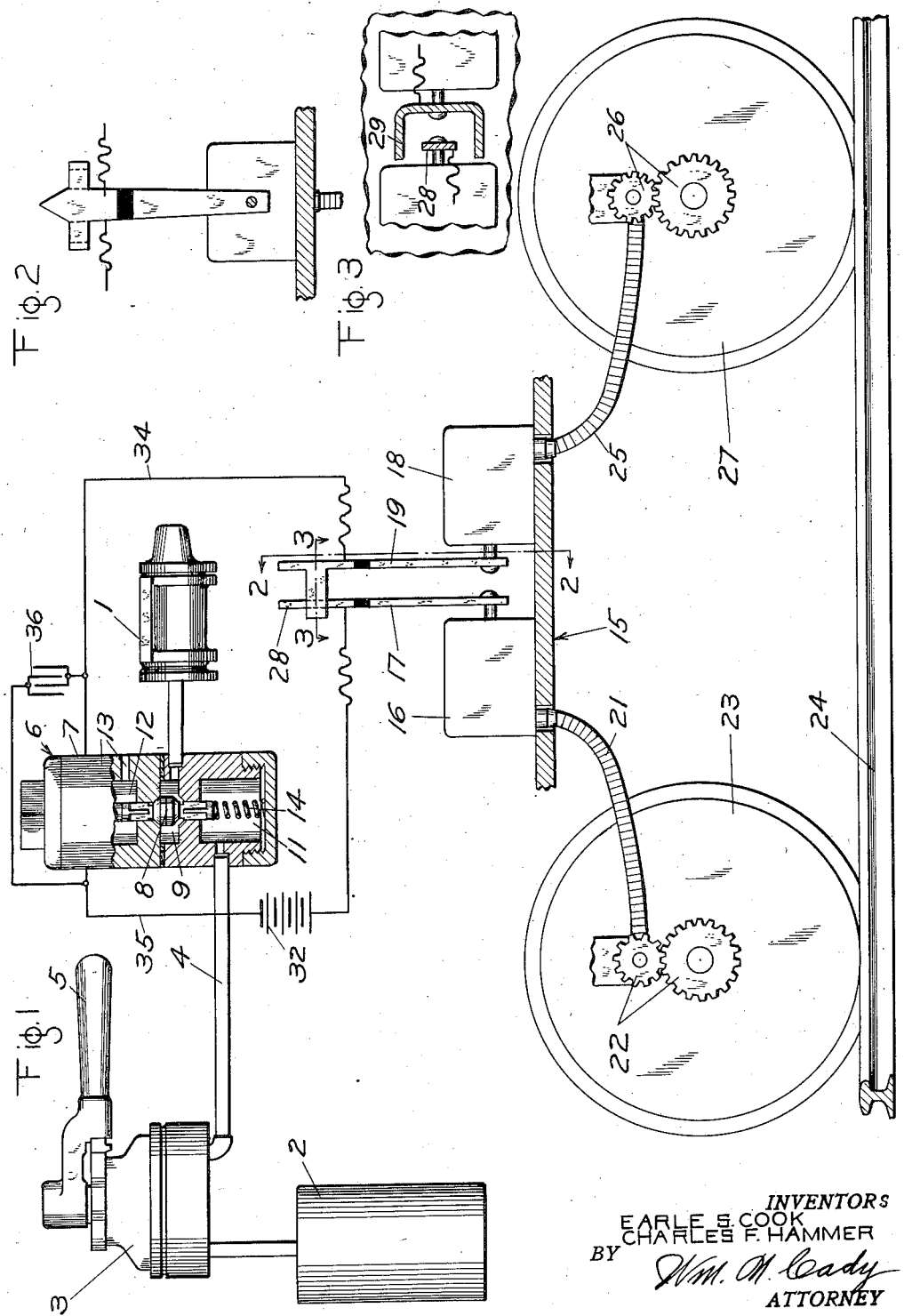
INVENTORS
EARLE S. COOK
CHARLES F. HAMMER
BY
Wm. M. Cady
ATTORNEY Patented Apr. 21, 1936

2,038,147

UNITED STATES PATENT OFFICE 2,038,147

WHEEL SLIDING PROTECTOR DEVICE

Earle S. Cook, Wilkinsburg, and Charles F. Hammer, Greensburg, Pa., assignors to The Westinghouse Air Brake Company, Wilmerding, Pa., a corporation of Pennsylvania Application July 31, 1934, Serial No. 737,707

9 Claims. (Cl. 303—21)

Our invention relates to brake equipment for vehicles, and more particularly to means for reducing the degree of application of the brakes upon the slipping of the wheels on the rails.

It is well known that for a given braking pressure, friction type brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at the high speeds, and, as the speed of the vehicle decreases, to so operate the brakes as to cause the braking pressure to decrease in such manner that the vehicle is brought to a stop quickly and smoothly, without dangerous shock or sliding of the wheels.

When railway trains and traction vehicles are operated at very high speeds, a correspondingly high braking force must be employed to bring the train or vehicle to a stop in a reasonable length of time. When such braking forces are applied, the problem of properly reducing the braking force by manual operation as the vehicle slows down becomes a difficult one and there is considerable danger of the wheels sliding on the rails. It is therefore desirable to provide, as part of the braking equipment on high speed trains and vehicles, some means for detecting and relieving wheel sliding when it occurs.

It is desirable that the braking force be reduced as soon as the wheel starts to slip, or while it is rotating at a speed only slightly below its free rolling speed. By reducing the braking force during the incipient stage of wheel sliding, a much less reduction in the braking force applied to the brake shoes is required to again permit free rolling of the wheel on the rails, and the average effective braking force is maintained at a higher value.

In accordance with our invention a brake releasing means is provided having an element responsive to the rotating speed of one pair of vehicle wheels and an element responsive to the rotating speed of a second pair of vehicle wheels, the two elements operating at the same speed when the several wheels are freely rolling on the rails and at different speeds if one pair of wheels slip on the rails.

Several devices have been suggested as means for protecting the car wheels against sliding on the rails when the braking force on the wheels exceeds the value necessary to maintain adhesion between the wheels and rails. Such proposed devices all have one or more of the following undesirable characteristics; namely, they do not operate until the car wheel speed is reduced to an extremely low value, they operate at a fixed wheel speed instead of upon a fixed differential relation between the actual wheel speed and the desired or free rolling wheel speed, they do not assure that the wheel will regain the train speed before the brakes are again applied, they do not operate after the wheel has completely stopped rotating, a reduction in the diameter of the vehicle wheel caused by wear changes the accuracy of the device, reversing mechanism operable either manually or automatically is required in order to use the device in either direction of train travel, they are readily affected by sharp surges of other impulses set up in the train.

It is an object of this invention to provide means for preventing the car wheels from sliding on the rails, and which will not be subject to any of the above outlined limitations.

Other advantages and objects of our invention will appear from the following description of a specific embodiment thereof taken in connection with the accompanying drawing, in which Fig. 1 is a diagrammatic view of circuits and apparatus illustrating one preferred embodiment of the invention.

Fig. 2 is a sectional view along the line 2—2 in Fig. 1, and

Fig. 3 is a detailed sectional view taken along the line 3—3 in Fig. 1.

Referring to the drawing, and more particularly to Fig. 1 thereof, the numeral 1 indicates the brake cylinder of a fluid pressure brake that is supplied with fluid under pressure from the reservoir 2, through the brake valve device 3 and brake cylinder pipe 4, in accordance with the operation of the brake valve handle 5 to an application position, and from which fluid under pressure is released to the atmosphere through the brake cylinder pipe 4 and the brake valve device 3 upon the operation of the handle 5 to its release position in a well known manner.

A magnet valve device 6 is provided for controlling communication through which the brake valve device 3 supplies fluid under pressure to the brake cylinder 1, and the venting of fluid under pressure from the brake cylinder 1 to the atmosphere when the handle 5 of the brake valve device 3 is in a brake applying position. The magnet valve device 6 comprises a magnet 7 that is operatively connected to a double beat valve 8, contained within a valve chamber 9, for controlling communication between the valve chamber 9 and an inlet chamber 11, and between valve chamber 9 and an outlet chamber 12 that is connected to the atmosphere through an exhaust port 13. A spring 14 is provided in the inlet chamber 11 for biasing the valve 8 to its upper, or illustrated, seated position to close communication between the valve chamber 9 and the atmosphere and to open communication between the brake valve device 3 and the brake cylinder 1.

A contact making electrical differential device 15 is provided for controlling the operation of the magnet valve device 6, and comprises a speedometer 16 for positioning a contact carrying arm 17 in accordance with the speed of one car wheel and a speedometer 18 for positioning a contact carrying arm 19 in accordance with the speed of another car wheel. The speedometer 16 is operatively connected, through a flexible shaft 21 and gear wheels 22, to operate in accordance with the rate of rotation of the vehicle wheel 23 on the rail 24, and the speedometer 18 is operatively connected, through the flexible shaft 25 and the gear wheels 26, to operate in accordance with the rate of rotation of the vehicle wheel 27 as it rolls on the rail 24.

Since the position of the contact carrying arm 17 is a measure of the rotational speed of the car wheel 23, and the position of the contact carrying arm 19 is a measure of the rotational speed of the car wheel 27, there will be no relative movement between the contact carrying arms 17 and 19 so long as both wheels 23 and 27 are freely rolling along the rail 24. Should the operator move the handle 5 of the brake valve device 3 to supply fluid under pressure from the reservoir 2 to the brake cylinder 1 to apply the brakes, and should the degree of application of the brakes become sufficient to cause one of the wheels, say, for example, the wheel 23, to slip on the rail 24 while the wheel 27 continues to roll along the rail 24, the position of the contact carrying arm 17 will move relative to that of the contact carrying arm 19 causing engagement of the contact member 28 carried by the arm 17 with one of the bifurcated ends of the contact members 29 carried by the contact arm 19, to close a circuit from a source of electrical energy 32, through conductor 33, contact members 28 and 29, conductor 34, the winding of the magnet 7 and conductor 35 to the battery 32. Upon closing the above traced circuit, the winding of the magnet 7 becomes energized and moves the valve 8 downwardly to close communication between the reservoir 2 and the brake cylinder 1, and to open communication from the brake cylinder 1 through the outlet chamber 12 and exhaust port 13 to the atmosphere to reduce the degree of application of the brakes. When the degree of application of the brakes has been reduced sufficiently to cause the wheel 23 to again freely roll along the rail 24, so that the wheel 23 again rotates at the same speed as the wheel 27, then the contact carrying arms 17 and 19 are relatively positioned, so that the contact member 28 will be moved out of engagement with the contact member 29, thus causing deenergization of the magnet 7 of the magnet valve device 6 and permitting the spring 14 to move the valve 8 to its upper seated, or illustrated, position. In this position of the valve 8 the release of fluid under pressure from the brake cylinder 1 through the exhaust port 13 is discontinued and the flow of fluid under pressure from the reservoir 2 to the brake cylinder 1 is again controlled by the brake valve device 3.

It will be apparent from the above description that we have provided an anti-wheel sliding mechanism that is operative to reduce the braking pressure upon a slight decrease in the speed of the car wheel below its free rolling speed and that will continue to be effective until the braking pressure is reduced sufficiently that the car wheel no longer slips on the rail. It will also be noted that the above described anti-sliding mechanism is independent of the direction of operation of the vehicle to which it is applied, since the several wheels of the vehicle necessarily reverse their direction of rotation together.

It is extremely unlikely that the several pairs of wheels throughout the train or car will slide simultaneously on the rails or will decrease their rate of rotation by like amounts in case the brakes are applied sufficiently to cause any of the wheels to slide. However it will be apparent that one of the speedometers of the contact making control mechanism may be connected to a wheel axle that is permitted to freely roll along the rails at all times and to which the brakes are not applied.

While we have illustrated and described one preferred embodiment of our invention, it will be apparent to those skilled in the art that many changes in the circuits and apparatus described may be made within the spirit of our invention and we do not wish to be limited otherwise than by the scope of the appended claims.

Having now described our invention, what we claim as new and desire to secure by Letters Patent, is:

1. In a brake equipment for vehicles, in combination, braking means, manually operable means for controlling the application and release of the brakes, electrically operable means for reducing the degree of application of the brakes independently of said manually operable means, and control means therefor comprising a pair of movable electric contact members adapted to be engaged, means for actuating one of said movable contact members in accordance with the speed of a car wheel, and means for actuating the other of said movable contact members in accordance with the speed of another wheel to cause said contact members to be brought into engagement upon a variation between the speeds of said car wheels.

2. In a brake equipment for vehicles, in combination, braking means, manually operable means for controlling the application and release of the brakes, electrically operable means for decreasing the degree of application of the brakes independently of said manually operable means, a speedometer operated in accordance with the speed of one car wheel, a speedometer operated in accordance with the speed of another car wheel, and circuit controlling means comprising a pair of cooperating contact members adapted to be engaged, one member being actuated by each of said speedometers and differentially responsive to the speed of said speedometers for controlling the operation of said electrically operable means.

3. In a brake equipment for vehicles, in combination, braking means, manually operable means for controlling the application and release of the brakes, electrically operable means for decreasing the degree of application of the brakes independently of said manually operable means, a speedometer operated in accordance with the speed of one car wheel, a speedometer operated in accordance with the speed of another car wheel, indicating means respectively responsive to the operation of said speedometers, and 2,038,147 cooperating contact members movable into engagement upon a variation in the positions of said indicating means for controlling the operation of said electrically operable means.

4. In a brake equipment for vehicles, in combination, braking means, manually operable means for controlling the application and release of the brakes, electrically operable means for releasing the degree of application of the brakes independently of said manually operable means, a speedometer operated in accordance with the speed of one of said car wheels, a speedometer operated in accordance with the speed of another car wheel, contact carrying means responsive to the operation of said speedometers, and means responsive to a variation in the positions of said contact carrying means for bringing said contact members into engagement to control the operation of said electrically operable means.

5. In a brake equipment for vehicles, in combination, a brake cylinder, means for supplying fluid under pressure to said brake cylinder to apply the brakes, electrical means for releasing fluid under pressure from said brake cylinder, control means for said electrical means comprising a pair of cooperating contact members adapted to be engaged, means for actuating one of said contact members in accordance with the speed of one track wheel, and means for actuating the other of said contact members in accordance with the speed of another track wheel.

6. In a braking equipment for vehicles, in combination, a brake cylinder, means for supplying fluid under pressure to said brake cylinder to apply the brakes, electrical means for releasing fluid under pressure from said brake cylinder, control means for said electrical means comprising a pair of cooperating contact members adapted to be engaged, a speedometer for actuating one of said contact members in accordance with the speed of one track wheel, and a speedometer for actuating the other of said contact members in accordance with the speed of another track wheel.

7. In a brake equipment for vehicles, in combination, a brake cylinder, means for supplying fluid under pressure to said brake cylinder to apply the brakes, electrical means for releasing fluid under pressure from said brake cylinder, means for controlling said electrical means to effect a reduction in braking force comprising a control circuit and means for controlling said circuit comprising a pair of cooperating contact members adapted to be engaged, means for actuating one of said contact members in accordance with the speed of one track wheel, and means for actuating the other of said contact members in accordance with the speed of another track wheel.

8. In a brake equipment for vehicles, in combination, braking means, manually operable means for controlling the application and release of the brakes, electrically operable means for reducing the degree of application of the brakes independently of said manually operable means, control means for governing the operation of said electrically operable means comprising an energizing circuit therefor and cooperating contact members for controlling said circuit, a speedometer operated in accordance with the speed of one of said car wheels for controlling the movement of one of said contact members, a speedometer operated in accordance with the speed of another car wheel for controlling the movement of the other of said pair of contact members, said cooperating contact members being movable into engagement to effect the energization of said electrically operable means upon lack of correspondence in the speed of said two speedometer devices.

9. In a brake equipment for vehicles, in combination, a brake cylinder, means for supplying fluid under pressure to said brake cylinder to apply the brakes, electrical means for releasing fluid under pressure from said brake cylinder, a source of electrical energy for controlling the operation of said electrical means and control means for completing a circuit from said source of energy to said electrical means comprising a pair of cooperating contact members that are adapted to be brought into engagement to complete said circuit upon a predetermined variation in their relative positions, means for positioning the one of said contact members in accordance with the speed of one car wheel and means for positioning the other of said contact members in accordance with the speed of another car wheel.

EARLE S. COOK.
CHARLES F. HAMMER.